Sept. 4, 1951 C. E. MORLEY 2,566,497
MIRROR CONSTRUCTION
Filed Jan. 16, 1948

INVENTOR.
Charles E. Morley.
BY
Harness, Dickey & Pierce
ATTORNEYS.

Patented Sept. 4, 1951

2,566,497

UNITED STATES PATENT OFFICE 2,566,497

MIRROR CONSTRUCTION

Charles E. Morley, Detroit, Mich.

Application January 16, 1948, Serial No. 2,626

1 Claim. (Cl. 88—98)

This invention relates to the construction of mirror devices and backing and supporting means therefor, and is particularly useful in connection with, although not restricted in utility to, rear view mirrors of the class employed as accessory devices attached to the exteriors of motor vehicles to afford the driver better rearward vision, along a line close to the body of the vehicle, than is possible with inside-mounted mirrors.

Such mirrors must be of adjustable character to permit tilting for adjustment to the convenience of the driver and to the character of the vehicle body, and since the silvered or other reflective surfaces of mirrors are subject to deterioration by the weather, and by the salts and acids often present in the water which is thrown against such mirrors in service, manufacture of a high quality product which will maintain its reflective efficiency over a long period of time demands that the mirror be so installed in its backing and supporting housing as to be effectively protected against entrance of moisture, dirt, and foreign elements. It will also be understood that devices of this character must present a neat and attractive appearance.

With the foregoing and other considerations in mind, the present invention aims to provide an improved rear view mirror of the character indicated which, although simple and cheap to manufacture, and adapted to large volume production, provides more effective protection of the reflective surface than has heretofore been possible in a construction of comparable appearance and simplicity.

Another object of the invention is to provide an improved novel double shell structure for enclosing the reflective backing of a conventional rear-silvered mirror, including a light gauge sheet metal outer finishing and retaining shell which also serves as a part of the adjustable supporting means for the mirror, and a reinforcing inner shell which not only stiffens the assembly so as to afford a very rigid construction which resists deformation but provides an effective support for and a virtually hermetic seal around the edges of the supported mirror element, prevents damaging the mirror both during manufacture and afterwards, and performs other important functions which will become apparent.

Still another object is to provide such a double shell backed mirror construction incorporating a universally adjustable supporting structure whereby the mirror may be tilted to any desired angle with respect to a supporting arm or bracket, which universal supporting structure is carried partly by the outer shell but is substantially housed between the inner and outer shells, the arrangement of the parts being such that any moisture or other foreign matter which finds its way into the adjustable supporting structure and between the shells cannot contact the reflective surface of the mirror.

Still another object is to provide such a shell-enclosed mirror assembly incorporating improved protective means for preventing damage to the glass of the mirror during the performance of necessary deforming operations upon the shell structure, such protective means taking the form of a reaction portion formed integrally with the inner shell.

Another object is to provide a mirror assembly having such a novel double shell structure wherein the inner shell incorporates integral parts functioning to support sealing gasket means coacting with the mirror glass and with the inner and outer shells to provide virtually hermetic sealing of the glass, the inner shell acting as a completely sealed wall which isolates the adjustable supporting portions previously mentioned from the mirror glass.

Other objects and advantages will be apparent upon consideration of the present disclosure in its entirety.

Figure 1:
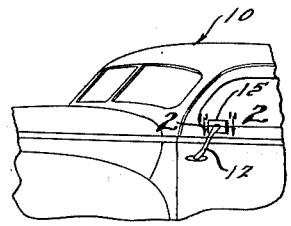
Figure 1 is a perspective view of a portion of a motor vehicle body showing an accessory outside rear view mirror attached thereto and incorporating the principles of the present invention.
Figure 2:
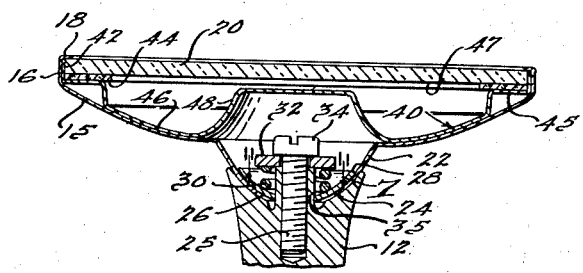
Fig. 2 is a cross sectional view of the mirror and associated supporting means upon a larger scale taken substantially on the line 2—2 of Fig. 1 and looking in the direction of the arrows.

Referring now to the drawings, reference character 10 designates generally a closed motor vehicle body indicated as of the sedan type. The type and construction of the vehicle of course form no part of the present invention. The body is shown as provided with a bracket arm 12 projecting from the side thereof near the front and supporting my improved mirror construction, the outer backing shell or casing of which is generally designated 15.

The outer shell 15 is provided with a peripheral portion 16 which projects outwardly substantially in straight lines defining wall portions perpendicular to the general plane of the mirror and adapted to receive the mirror glass, but larger than the glass to accommodate the corresponding interposed portion 42 of the inner shell 40. Peripheral portion 16 extends outwardly far enough so that the margins thereof may be bent over, as at 18 to retain the mirror 20. The mirror may be formed of glass and silvered upon the inner surface. The shell assembly is shown as of rectangular form.

The outer shell is provided centrally with a protruding partly spherical boss 22 adapted to coactively interfit with a corresponding contoured socket 24 formed in the end of the supporting arm 12, the boss being universally movable in the socket to provide a ball-type universal joint support for the mirror.

A stud 25 projects axially from the socketed portion 24 of the arm 12 to provide a supporting stem, and extends into the interior of the boss 22 through an opening 26 formed in the apex of the boss. A spherical washer 28 is fitted within and seated against the inner surface of the boss portion 22, against which it is yieldably held by a helical compression spring 30 trapped on the stem within the boss and retained by a washer 32 and nut 34. The socketed portion of the arm 12 is formed with an integral re-entrant collar portion 35 closely surrounding the stud 25 and projecting into the socket far enough to extend through both the boss 22 and washer 28, and also into the end of the spring 30, which it serves to locate. The exterior of the collar portion 35 is of square or of other noncircular cross section, and the center opening (undesignated) in the washer 28 is of similar form so that such washer is keyed against rotation with respect to the arm 12 by the collar 35. By virtue of this arrangement, rotation of the mirror shell cannot turn the washer 28 or spring 30 so that no torque is transmitted to the washer 32 or nut 34 in response to any rotation imparted to the mirror during adjustment thereof, and unwanted loosening of the mirror cannot be induced by rotating it.

Fitted into the outer shell 15 is an inner shell 40 proportioned to fit closely against and so reinforce the greater proportion of the outer shell. The outer shell may be formed of relatively light gauge brass or other virtually non-corrosive material, while the inner shell may be of steel. The rim of the inner shell is provided with a straight peripheral mirror-receiving flange portion 42 which fits closely within the flange portion 16 of the outer shell, but is shorter, so that the extremity of portion 42 will be substantially flush with the outer surface of the mirror glass 20 when the latter is installed, the glass being proportioned to fit freely but with reasonable accuracy within the inner shell flange portion 42. A sealing and cushioning gasket 44 is also arranged beneath the mirror 20, upon a flat seating shoulder portion 45 also formed integrally with the inner shell 40. The portion of the inner shell intermediate the center thereof and the gasket shoulder 45 is crowned conformably to and adapted to bear against the inner surface of the outer shell, such crowned reinforcing portion of the inner shell being designated 46. The portion of the inner shell opposite the boss portion 22 of the outer shell is provided with a generally complementary re-entrant or concave boss portion 48 adapted to coact with the boss portion 22 to form a housing for the stud 25 and associated securing portions previously described. It will be observed that the convexly crowned character of the double shell assembly provides ample space behind the glass 20 for the re-entrant housing boss portion 48, and that this is formed as a continuous part of the inner shell, the inner shell being of continuous character, without openings or joints, and sealed with respect to the glass 20 by the gasket 44. Thus, if any moisture should find its way between the socket 24 and boss 22 and into the space within the boss 22, it cannot contact the reflective coating 47.

The depth of the straight rim portion 42 of the inner shell substantially corresponds to the combined thicknesses of the mirror glass 20 and gasket 44 when the gasket is relaxed, but is preferably slightly less than such combined thickness, so that when the peripheral portion 18 of the outer shell is bent down upon the glass, the gasket is slightly compressed.

Figure 4:
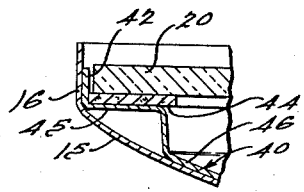
Figs. 4, 5 and 6 are fragmentary sectional views showing the portions of my improved mirror adjacent the periphery thereof upon a still larger scale and successively indicating the positions assumed by the mirror-securing flange during deformation thereof.
Figures 5, 6:
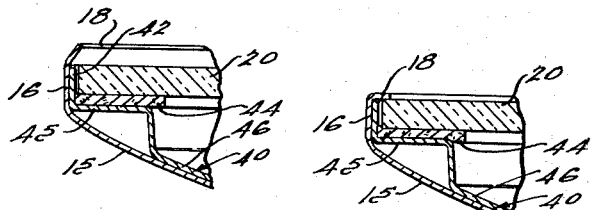
Figure 7:
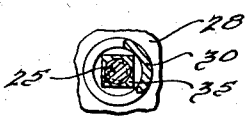
Fig. 7 is a sectional detail taken substantially on the line 7—7 of Fig. 2 and looking in the direction of the arrows.
Figure 3:
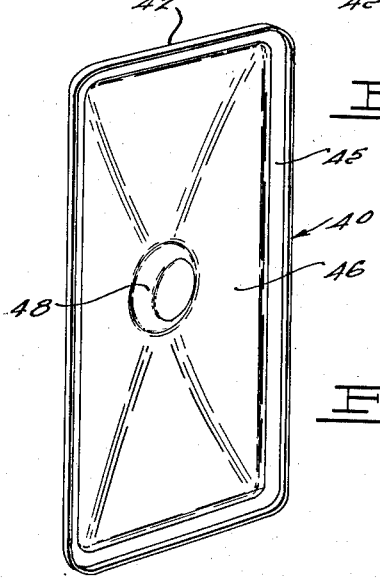
Fig. 3 is a perspective view of the inner shell.

The inward flanging of the portion 18 to retain the glass may be effected in any suitable manner, as by means of rolls or dies, and successive positions it assumes during inward deformation thereof are indicated in Figs. 4, 5 and 6. As also shown in these views, the rim portion 42 of the inner shell is only very slightly shorter than the combined thickness of the glass and gasket when the gasket is relaxed, so that the rim portion 42 forms a reaction element over which the outer shell rim 18 bends during flanging. The material of which the inner shell is formed is stiff enough to prevent the exertion of any inward force against the edge of the glass during flanging, and the only pressure exerted upon the glass is a slight downward pressure exerted thereupon by the inner edge of the retaining flange portion 18 after completion of the flanging operation. The glass is thus firmly seated against the gasket and the gasket pressed against the seat portion 45, providing an effective seal against entry of moisture or foreign matter into the space within the inner shell. The outer shell is also substantially sealed, since the only lines along which leakage could possibly occur are those between the glass and flange 18, where the engagement is tight, and between the boss 22 and socket 24, where yieldable pressure is maintained at all times due to the effect of the spring 30. Even if a slight amount of moisture should find its way into the outer shell along either of these lines, however, it will be observed that the mirror element itself remains completely protected and the reflective coating may therefore be relied upon to remain undamaged and to provide full reflective efficiency over a long period of time.

While it will be apparent that the preferred embodiment of my invention herein disclosed is well calculated to fulfill the objects and advantages first above stated, it will be apparent that the invention is susceptible to variation, modification and change without departing from the proper scope and fair meaning of the subjoined claim.

I claim:

A mirror construction including in combination with a reflective panel, a supporting housing for said panel comprising a pair of nested sheet metal shells including an inner shell having a seat portion near its periphery, said reflective panel being fitted close to said seat portion, gasketing means interposed between said seat portion and panel, a protective rim portion formed integrally with said inner shell and extending outwardly and at least partially around said gasketing means and panel, said outer shell having a peripheral holding portion bent inwardly over said rim portion of the inner shell and extending inwardly from the edge of the panel to retain the panel and inner shell, said inner shell providing an unbroken enclosure for all portions of the inner surface of the panel lying within the line bounded by the gasketing means, and ball and socket means including a ball portion formed integrally with said outer shell for supporting the mirror assembly, said supporting means comprising a generally spherical hollow boss portion formed integrally with said outer shell and spaced from the inner shell, and means for securing said boss portion and thereby the remainder of the assembly with respect to a supporting bracket arm or the like, said supporting means including a stud member housed at least partly within said boss and entirely outside of the inner shell, and a reaction element located in said boss portion between the inner and outer shells and bearing against the interior of such boss portion.

CHARLES E. MORLEY.

REFERENCES CITED

The following references are of record in the file of this patent:

UNITED STATES PATENTS

| Number | Name | Date |
|---|---|---|
| 246,038 | Schneider | Aug. 23, 1881 |
| 1,537,039 | Short | May 5, 1925 |
| 2,102,012 | La Hody | Dec. 14, 1937 |
| 2,112,656 | Ponce | Mar. 29, 1938 |
| 2,187,582 | Anderson | Jan. 16, 1940 |